US010594903B2

(12) United States Patent
Finlayson

(10) Patent No.: US 10,594,903 B2
(45) Date of Patent: Mar. 17, 2020

(54) METHOD AND SYSTEM FOR DETERMINING PARAMETERS OF AN IMAGE PROCESSING PIPELINE OF A DIGITAL CAMERA

(71) Applicant: Spectral Edge Limited, Oakham, Rutland (GB)

(72) Inventor: Graham Finlayson, Norwich (GB)

(73) Assignee: SPECTRAL EDGE LIMITED (GB)

( * ) Notice: Subject to any disclaimer, the term of this patent is extended or adjusted under 35 U.S.C. 154(b) by 79 days.

(21) Appl. No.: 15/528,981

(22) PCT Filed: Nov. 24, 2015

(86) PCT No.: PCT/GB2015/053582
§ 371 (c)(1),
(2) Date: May 23, 2017

(87) PCT Pub. No.: WO2016/083796
PCT Pub. Date: Jun. 2, 2016

(65) Prior Publication Data
US 2017/0272619 A1    Sep. 21, 2017

(30) Foreign Application Priority Data
Nov. 24, 2014 (GB) .................. 1420876.3

(51) Int. Cl.
*G06K 9/40* (2006.01)
*G06K 9/54* (2006.01)
(Continued)

(52) U.S. Cl.
CPC ....... *H04N 1/6052* (2013.01); *H04N 1/00127* (2013.01); *H04N 1/6058* (2013.01); *H04N 9/64* (2013.01)

(58) Field of Classification Search
USPC .......................... 382/303, 254, 312
See application file for complete search history.

(56) References Cited

U.S. PATENT DOCUMENTS

2010/0149203 A1* 6/2010 Mebane .................. G09G 5/02
345/589
2014/0307104 A1* 10/2014 Finlayson ............ H04N 1/6083
348/187
2014/0307958 A1* 10/2014 Wang .................. G06K 9/6256
382/159

OTHER PUBLICATIONS

Linear demosaicing inspired by the human visual system. IEEE Transactions on Image Processing, 14(4):439-449, 2005. 3.
(Continued)

*Primary Examiner* — Kathleen Y Dulaney
(74) *Attorney, Agent, or Firm* — Leason Ellis LLP

(57) ABSTRACT

A method and system for determining parameters of an image processing pipeline of a digital camera is disclosed. The image processing pipeline transforms captured image data on a scene into rendered image data. Rendered image data produced by the image processing pipeline of the camera is obtained from the captured image data on the scene. At least a subset of the captured image data on the scene is determined and a ranking order for pixels of the rendered image data is obtained. A set of constraints from the captured image data and the ranked rendered image data is determined, each constraint of the set being determined in dependence on selected pair combinations of pixel values when taken in said ranking order of the rendered image data and corresponding pair combinations of the captured image data. Parameters of the image processing pipeline are determined that satisfy the sets of constraints.

20 Claims, 5 Drawing Sheets $\underline{p}$
raw RGB $M\underline{p}$
raw x 3x3 Matrix $\Gamma(M\underline{p})$ $\underline{p} = f(\Gamma(M\underline{p}))$
final rendered RGB

Figure 1

(51) Int. Cl.
G06K 7/00 (2006.01)
H04N 1/60 (2006.01)
H04N 9/64 (2006.01)
H04N 1/00 (2006.01)

(56) References Cited

OTHER PUBLICATIONS

M. Anderson, R. Motta, S. Chandrasekar, and M. Stokes. Proposal for a standard default color space for the internet: srgb. In IS& T and SI D's 4th Color Imaging Conference, pp. 238-245. 1995. 1 , 4, 7.
R. Barlow and H. Bunk. The isotonic regression problem and its dual. Journal of the American Statistical Association, pp. 140-147, 1972. 6.
K. Barnard, L. Martin, A. Coath, and B. V. Funt. A comparison of computational color constancy algorithms. ii. experiments with image data. IEEE Transactions on Image Processing, 11 (9):985-996, 2002. 2.
G. J. Brostow, C. Hern'andez, G. Vogiatzis, B. Stenger, and R. Cipolla. Video normals from colored lights. IEEE Trans. Pattern Anal. Mach. Intel l., 33(10):2104-2114, 2011. 4.
M. Darrodi, G. Finlayson, T. Goodman, and M.Mackiewicz. A ground truth data set for a nikon camera's spectral sensitivity estimation. 2014. 7.
P. Debevec and J. Malik. Recovering high dynamic range radiance maps from photographs. In SIGGRAPH, pp. 369-378, 1997. 3.
M.S. Drew and M. H. Brill. Color from shape from color: a simple formalism with known light sources. J. Opt. Soc. Am. A, 17(8): 1371-1381, Aug. 2000. 4.
G. Finlayson. Color in perspective. IEEE transactions on analysis and Machine Intelligence, pp. 1034-1038, Oct. 1996. 5.
D. H. Foster, K. Amano, S. M. C. Nascimento, and M. J. Foster. Frequency of metamerism in natural scenes. J. Opt. Soc. Am. A, 23(10):2359-2372, Oct. 2006.
E. K. Garcia, R. Arora, and M. R. Gupta. Optimized regression for efficient function evaluation. IEEE Transactions on Image Processing, 21 (9):4128-4140, 2012. 3,6.
J. Giesen, E. Schuberth, K. Simon, P. Zolliker, and O. Zweifel. Image-dependent gamut mapping as optimization problem. Image Processing, IEEE Transactions on, 16(10):2401-2410, Oct. 2007. 1, 5, 7.
J. Gu, J. Jiang, S. Susstrunk, and D. Liu. What is the space of spectral sensitivity functions for digital color cameras? In Proceedings of the 2013 IEEE Workshop on Applications of Computer Vision (WACV), WACV '13, pp. 168 179, 2013. 8.
J. Holm Issues relating to the transformation of sensor data into standard color space. In IS&T and SID's 5th Color Imaging Conference, pp. 290-295. 1997. 3.
H. T. Lin, Z. Lu, S. J. Kim, and M. S. Brown. Nonuniform lattice regression for modeling the camera imaging pipeline. In European Conference on Computer Vision, vol. 7572 of Lecture Notes in Computer Science, pp. 556 568. Springer, 2012. 2, 3.
S. Lin, J. Gu, S. Yamazaki, and H.-Y. Shum. Radiometric calibration from a single image. In Computer Vision and Pattern Recognition, 2004. CVPR 2004. Proceedings of the 2004 IEEE Computer Society Conference on, vol. 2, pp. 11-938-11-945 vol. 2, Jun. 2004. 3.
G. W. Meyer, H. E. Rushmeier, M. F. Cohen, D. P. Greenberg, and K. E. Torrance. An experimental evaluation of computer graphics imagery. ACM Transactions on Graphics, 5:30-50, 1986. 7, 8.

T. Mitsunaga and S. Nayar. Radiometric Self Calibration. In IEEE Conference on Computer Vision and Pattern Recognition (CVPR), vol. 1, pp. 3 74-380, Jun. 1999.2.
S. U. D. of Statistics. Project ORION., J. Friedman, and R. Tibshirani. The Monotone Smoothing of Scatterplots. 1983. 6.
E. Rakhmanov, E. Saff, and Y. Zhou. Minimal discrete energy on a sphere. Mathematical Research letters, pp. 547-662, 1994. 5.
R. Ramanath, W. Snyder, Y. Yoo, and M. Drew. Color image processing pipeline. Signal Processing Magazine, IEEE, 22(1 ):34-43, 2005. 1, 3.
E. Reinhard, M. Stark, P. Shirley, and J. Ferwerda. Photographic tone reproduction for digital images. ACM Trans. Graph., 21 (3):267-276, Jul. 2002. 1.
M. Stokes, M. Fairchild, and R. Berns. Precision requirements for digital color reproduction. ACM Transactions on Graphics, 11 (4):406-422, Oct. 1992. 7.
Y. Xiong, D. Scharstein, A. Chakrabarti, T. Darrell, B. Sun, K. Saenko, and T. Zickler. Modeling radiometric uncertainty for vision with tone-mapped color images. IEEE Transactions on Pattern Analysis and Machine Intelligence, 99 (PrePrints): 1, 2014. 1, 2, 3, 4, 7, 8.
S. J. Kim, H. T. Lin, Z. Lu, S. Susstrunk, S. Lin, and M. S. Brown. A new incamera imaging model for color computer vision and its application. IEEE Transactions on Pattern Analysis and Machine Intelligence, 34(12):2289-2302, 2012. 1 2, 3, 4.
Kim et al. "A New In-Camera Imaging Model for Color Computer Vision and Its Application." IEEE Transactions on Pattern Analysis and Machine Intelligence, IEEE Computer Society, USA, vol. 34, No. 12, Dec. 1, 2012 (Dec. 1, 2012), pp. 2289-2302, XP011490762, ISSN: 0162-8828, DOI:10.1109/TPAMI .2012.58.
Chakrabarti et al. "An Empirical Camera Model for Internet Color Vision," Procedings of the British Machine Vision Conference 2009, Jan. 1, 2009 (Jan. 1, 2009), pp. 51.1-51.11, XP055260235, DOI: 10.5244/C . 23 .51 ISBN: 978-1-901725-39-1 p. 1-p. 4.
A. Chakrabarti, D. Scharstein, and T. Zickler. An empirical camera model for internet color vision. In British machine Vision Conference, 2009. 1, 2, 3, 7.
Isa 3664:2009. graphic technology and photography viewing conditions, 2009. 7.
M. d. Berg, 0. Cheong, M. v, Kreveld, and M. Overmars. Computational Geometry: Algorithms and Applications. Springer-Verlag TELOS, 3rd ed. edition, 2008, 5.
T. Gevers, G. D. Finlayson, and R. Schettini. Color for image indexing and retrieval. pp. 1-2. 2004. 2.
P. E. Gill, W. Murray, and M. H. Wright, Practical optimization. Academic Press Inc. [Harcourt Brace Jovanovich Publishers], 1981, 5.
J. Holm, Photometric tone and colour reproduction goals, In Proceedings of CIE Export Symposium on Colour Standards for Image Technology, pp. 51-56, 1996, 4.
A. Petrov. On obtaining shape from color shading, COLOR research and application, 18(4):236-240, 1993, 2.
F. P. Preparata and M. I. Simms. Computational Geometry: An Introduction. Springer-Verlag New York, Inc., New York, NY, USA, 1985. 5.
B. Smith, C. Spiekermann, and R. Sember, Numerical methods for colorimetric calculations: Sampling density requirements, COLOR research and application, 17(6):394-401, 1992. 7.
G. Wyszecki and W. Stiles. Color Science: Concepts and Methods. Quantitative Data and Formulas. Wiley New York, 2nd edition, 1982, 2 7.

\* cited by examiner

|  | Chakrabarti et al. | Rank-Based | Rank-based 3-fold CV |
|---|---|---|---|
| Panasonic: DMCLX3 | 0.011 | 0.011 | .012 |
| Canon: EOS 40D | 0.012 | 0.009 | 0.01 |
| G9 | 0.013 | 0.015 | 0.015 |
| PowerShot S90 | 0.011 | 0.012 | 0.011 |
| Nikon: D7000 | 0.012 | 0.014 | 0.015 |
| Mean Error | 0.0228 | 0.012 | 0.0126 |

Table 1. RMSE for mapping rendered to raw

METHOD AND SYSTEM FOR DETERMINING PARAMETERS OF AN IMAGE PROCESSING PIPELINE OF A DIGITAL CAMERA

CROSS-REFERENCE TO RELATED APPLICATIONS

This application is a U.S. National Stage Application under 35 U.S.C. § 371 of International Patent Application No. PCT/GB2015/053582, filed Nov. 24, 2015, which claims priority to Great Britain Application No. 1420876.3, filed Nov. 24, 2014, which are hereby incorporated by reference in their respective entireties.

FIELD OF THE INVENTION

The present invention relates to a method and system for determining parameters of an image processing pipeline of a digital camera and is particularly applicable for use in radiometric calibration of a digital camera.

BACKGROUND TO THE INVENTION

A camera is deemed radiometrically calibrated if there is a computational model which can predict how the raw linear sensor image is mapped to the corresponding rendered image (e.g. JPEGs) and vice versa. This mapping represents the processing that takes place in the camera's image processing pipeline.

In a typical image processing pipeline, as illustrated in FIG. 1, a raw sensor image is subjected to colour correction followed by gamut mapping and tone correction to result in a rendered image. This can be modelled mathematically as:

$$\underline{P} = \underbrace{f(\Gamma(M\underline{\rho}))}_{(1a)} = \underbrace{\Gamma(f(M\underline{\rho}))}_{(1b)} \approx \underbrace{LUT(\underline{\rho})}_{(1c)} \tag{1}$$

One particular issue with radiometric calibration is in determining the computational model.

The pipeline shown in Eqn. 1 and FIG. 1 is representative of photographic camera processing. Non photographic cameras can have simpler pipelines. Indeed, in a single sensor channel camera, the mapping from raw to rendered image is often modelled with a simple transfer curve (tone curve). The simplest colour cameras have red, green and blue sensors each of which is associated with a separate transfer curve:

$$\underline{P} = f(\underline{\rho}) \tag{2}$$

In (2) the function f( ) denotes a single or three per channel tone curves. If f( ) denotes 3 curves then radiometric calibration resorts to 3 separable grayscale calibrations.

In the photographic domain (and therefore being based on a pipelines such as in Eqn. 1) it is often desirable to understand how the linear raw image is mapped to the rendered counterpart and vice versa.

Note, however, that a raw image need not necessarily be the same image that is captured by the sensor. Rather, the sensor image may be processed in a number of steps to make the image raw. Steps may include dead-pixel correction and noise removal, demosaicing and flare correction. The nature of these computations is not considered here.

Raw to Rendered

Considering the question of how to perform radiometric calibration for Eqn. 1, in the pipeline form Eqn 1 b, Chakrabarti et al [35] minimize Eqns. 3a and 3b in iteration and then solve directly for gamut mapping in 3c $$\min_{M} \sum_{i} \|\Gamma(f(M\underline{\rho})) - \underline{P}\|^2 \tag{3a}$$

$$\min_{f()} \sum_{i} \|\Gamma(f(M\underline{\rho})) - \underline{P}\|^2 \tag{3b}$$

$$\min_{\Gamma} \sum_{i} \|\Gamma(f(M\underline{\rho})) - \underline{P}\|^2 \tag{3c}$$

where f( ) and $\Gamma$( ) are initialized in sensible way (e.g. to the identity function). In Eqn. 3b, f( ) is constrained to be a 7th order polynomial and monotonically increasing; and, in Eqn. 3c the $\Gamma$ function is modelled with the radial basis function method of [21] where, thousands of RBFs are potentially used.

A restriction of the above optimization is presented in [8] where they optimize Eqns. 3a and 3b and ignore gamut mapping. This less general model works surprisingly well on many real pairs of raw and rendered images and this is a point we will return to later in this description. In either the full or restricted optimizations [35] or [8], the coupled nature of the equations means that although the iterative minimization converges, it is possible that a global minimum is not found. An element of search is incorporated into the iterative optimization to mitigate this problem.

The method of Kim et al. [21], which solves for the pipeline in the form of Eqn. 1 a, makes additional assumptions to decouple the optimization and, in so far as these assumptions are valid, arrive at a globally optimal solution. That method begins with the assumption that images of the same scene are captured with respect to two or more exposures. Since in a linear image, double the light equals double the response we expect that $f^{-1}(\underline{P}_i^e) = 0.5 f^{-1}(\underline{P}^{2e})$ where the superscript e denotes exposure: 2e means twice as much light is captured. Debevec et al [10] showed how relating corresponding pixels under known exposure differences suffices to solve for f( ). Further in [21] it was assumed that for the set of disaturated pixels DS (those with rgbs far from the RGB cube boundary) the gamut mapping step has little or no effect and can be ignored. Relative to this assumption f( ) can be solved using the Debevec method.

Given f( ), [21] solves M– again, focusing only DS directly:

$$\min_{M} \sum_{i \in DS} \|f^{-1}(\underline{P}_i) - M\underline{\rho}_i\|^2 \tag{4}$$

Now, with M and f( ) in hand, $\Gamma$( ) is estimated using all the pixels in the image.

$$\min_{\Gamma} \sum_{i} \|f^{-1}(\underline{P}_i) - \Gamma(M\underline{\rho}_i)\|^2 \tag{5}$$

In [21], $\Gamma$( ) is implemented as a multi-thousand set of radial basis functions (RBFs). Whether used in [21] or [35], a large amount of training data is required to solve for $\Gamma$( ).

It is possible to ignore the underlying structure of the colour processing pipeline and solve for the best 3D subjective function—implemented as a look-up-table that maps the raw rgbs to rendered RGBs[22], see Eqn. 1c. Again, to use this method, a large corpus of training data is required. A further complication of this latter method is that the lookup-table has (and has to have for the best performance) a non-linear grid structure [22].

Finally, in [23] a method is presented for solving for f( ) by examining the edge distribution in an image. This method has the advantage that the method works for a single image (no need for multiple exposures) but the disadvantage that the method is sensitive to processing steps such as image sharpening (used extensively in mobile phone image processing).

STATEMENT OF INVENTION

According to an aspect of the present invention, there is provided a method for determining parameters of an image processing pipeline of a digital camera, the image processing pipeline transforming captured image data on a scene into rendered image data, the method comprising:
  obtaining rendered image data produced by the image processing pipeline of the camera from the captured image data on the scene;
  determining at least a subset of the captured image data on the scene; obtaining a ranking order for pixels of the rendered image data;
  determining a set of constraints from the captured image data and the ranked rendered image data, each constraint of the set being determined in dependence on selected pair combinations of pixel values when taken in said ranking order of the rendered image data and corresponding pair combinations of the captured image data; and,
  determining parameters of the image processing pipeline that satisfy the sets of constraints.

The image processing pipeline may be is a colour processing pipeline.

The parameters may be determined in the forward direction, mapping the captured to the rendered image. The parameters may be determined in the reverse direction, mapping the rendered to the captured image.

The subset of the captured image data on the scene may be obtained as RAW image data from the digital camera.

The scene may include a reference target, the method further comprising storing image data on the reference target, the step of determining including using the stored image data in place of captured image data on the scene.

Reference content of known colour in the scene may be inferred and used as a reference target.

The content may be identified in the image includes faces, the sky, grass and branded objects including food packaging.

The method may further comprise performing the steps of obtaining a ranking and determining a set of constraints for a colour channel of the rendered image data and captured image data.

The method may further comprise performing the steps of obtaining a ranking and determining a set of constraints for each colour channel.

The parameters may include a correction matrix.

Each "per channel" constraint comprises a half plane constraint, the step of determining parameters comprises determining an intersection region bounded by the half plane constraints and determining one row of a correction matrix within the intersection region.

The method may further comprise finding the best intersection of the set of half-planes.

The best intersection may be the vector, chosen from a discrete sample set, which satisfies the maximum number of half-plane constraints.

The method may further comprise deriving the parameters for the image processing pipeline for a given training image pair, the training image pair including raw image data and rendered image data.

The method may further comprise applying the parameters to an unseen raw image.

The unseen raw image may comprise a raw image from another camera.

The method may further comprise providing the parameters to a user.

The method may further comprise receiving one or more modifications to the parameters and/or the image processing pipeline via a user interface.

The method may further comprise:
placing a reference colour chart in the scene whose raw values are known for a reference camera or for a reference colour space; and,
recovering the rendered to raw image processing pipeline for the image of the colour chart in the scene by mapping the colour chart image to the known raw values.

The method may further comprise using the recovered image processing pipeline is used to process an image.

The recovered image processing pipeline may be used to process the captured scene excluding the colour chart.

The method may further comprise mapping a non-linear rendered image to its raw counterpart.

The method may further comprise tagging a rendered image with the processing steps required to map it to a raw image.

According to another aspect of the present invention, there is provided a system for determining parameters of an image processing pipeline of a digital camera, the image processing pipeline transforming captured image data on a scene into rendered image data, the method comprising:
  an input arranged to receive rendered image data produced by the image processing pipeline of the camera from the captured image data on the scene;
  a processor configured to execute computer program code for executing an image processing module, including:
  computer program code configured to determine at least a subset of the captured image data on the scene;
  computer program code configured to obtain a ranking order for pixels of the rendered image data;
  computer program code configured to determine a set of constraints from the captured image data and the ranked rendered image data, each constraint of the set being determined in dependence on selected pair combinations of pixel values when taken in said ranking order of the rendered image data and corresponding pair combinations of the captured image data; and,
  computer program code configured to determine parameters of the image processing pipeline that satisfy the sets of constraints.

The image processing pipeline may be a colour processing pipeline, the parameters being determined in the forward direction, mapping the captured to the rendered image.

The image processing pipeline may be a colour processing pipeline, the parameters being determined in the reverse direction, mapping the rendered to the captured image.

The system may further comprise a camera input, wherein the subset of the captured image data on the scene is obtained as RAW image data from the digital camera via the camera input.

The system may further comprise a reference target in the scene, the system being arranged to store image data on the reference target, the computer program code to determine the constraints being configured to use the stored image data in place of captured image data on the scene.

Embodiments of the present invention seek to provide methods and systems for use in rank-based radiometric calibration.

The inventors have observed that the rank order of a raw image, post colour correction, should be very similar to the rank order of a final rendered image. Embodiments of the present invention include a method that solves for the best rank preserving colour correction transform. Focussing on ranks allows decoupling of colour correction from other steps in camera processing pipelines and so permits a better estimate of colour correction than hitherto achieved. The corrected raw can then be mapped to the rendered image by applying a tone curve (or tone curves) which preserves rank ordering and minimizes a least-squares criterion.

A final gamut correction step may be applied to further reduce the overall fitting error. However, in preferred embodiments, gamut correction is parameterized by scores of variables. This is much simpler than the prior approaches to gamut correction which typically have thousands of variables.

Experimental results from tests on a variety of data sets have demonstrated that a method according to an aspect of the present invention delivers excellent results while requiring much reduced calibration data compared with the prior approaches.

Embodiments of the present invention demonstrate that the rank order of image responses is a powerful tool for solving for the individual steps in a camera processing pipeline (colour correction, gamut and tone mapping). A simple ranking argument, relating colour corrected raw rgbs to corresponding rendered RGBs suffices to solve for the colour correction matrix. The best rank-preserving a tone map can then be found and, finally, a modest—simpler than the prior approaches—gamut correction step can be performed. Compared to the prior approaches, embodiments of the present invention using radiometric calibration need the fewest assumptions. Experiments demonstrate that excellent calibration is possible given a single image exposure, where there is limited colour diversity (just a colour chart) and when there is a rendered (e.g. mobile phone image) but no corresponding paired raw to calibrate against.

In embodiments of the present invention, parameters of an image processing pipeline of a digital camera are determined. This may be for the purpose of calibrating the camera or for better understanding of images produced by the camera or for other uses. The process may determine the parameters for the forward direction (ie. to model how the pipeline work operate on raw image data obtained by the camera's sensor and transformed into a rendered image such as a JPEG) or it may be determined for the reverse direction (to enable raw image data representative of that captured by the sensor to be recovered from rendered images).

In selected embodiments, a reference target such as a colour chart having a known predetermined distribution of colours may be introduced into a scene. In such an arrangement, the target is identified in the image and the raw data (the captured image data) is substituted for pre-stored image data on the reference target to enable calibration of a rendered image without having possession of the raw data captured by the camera (as would be the case in most smartphones for example).

The reference target may be identified in the image from image processing or by user input, for example.

There may also be situations where a reference target is inferred through image analysis such as finding faces in images, finding sky or, generally recognizing objects.

Embodiments of the present invention are described by way of example only and with reference to the accompanying drawings.

BRIEF DESCRIPTION OF THE DRAWINGS FIGURES

DETAILED DESCRIPTION

Figure 1:
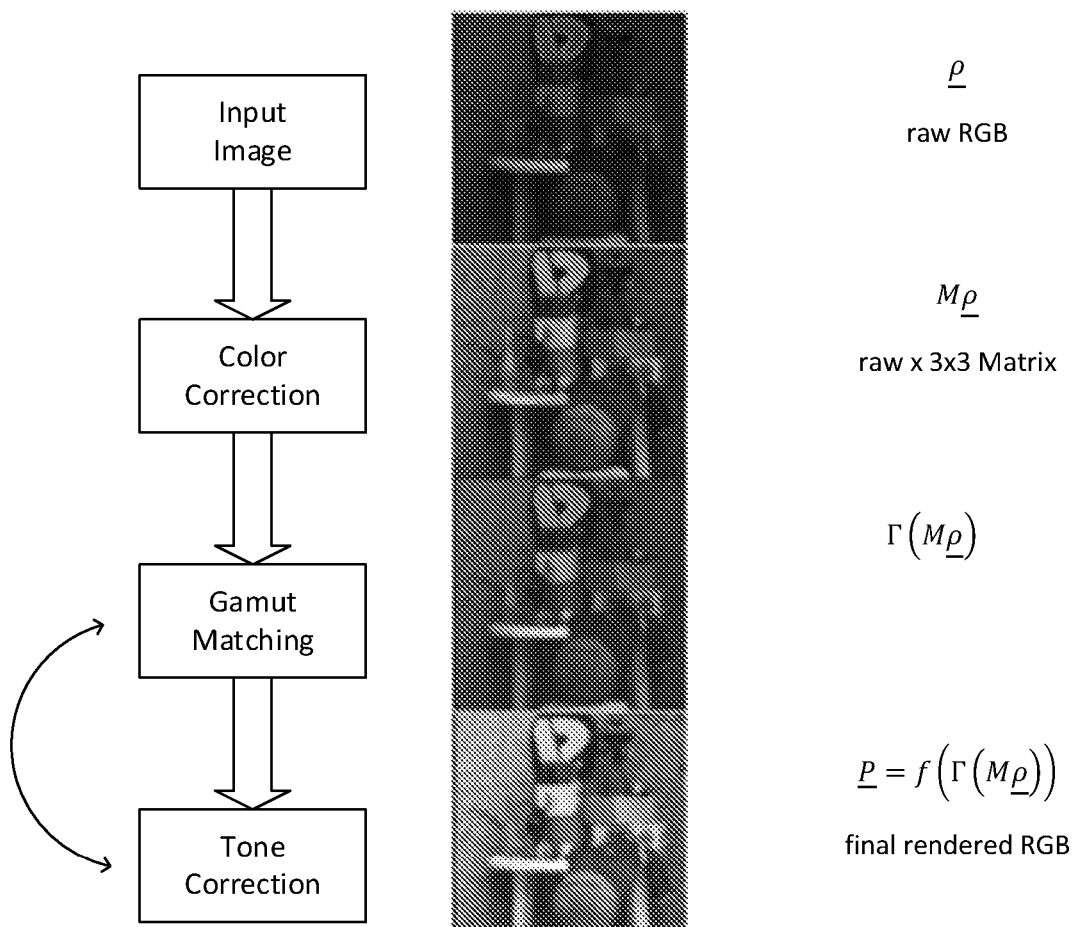
FIG. 1 illustrates an image reproduction pipeline in accordance with the present disclosure.

FIG. 1 illustrates a simple image reproduction pipeline that holds for many cameras (and that is often adopted by computer vision researchers). An exemplar image, processed according to the individual pipeline steps is shown in the middle column of the figure. The raw RGB image, FIG. 1a, is mapped by a 3×3 colour correction matrix to give the image shown in FIG. 1b. The colour correction matrix implements several processing steps. It accounts for (and discounts) the illumination colour, maps the rgbs to a colour space suitable for display and it can also implement aspects of colour preference. FIG. 1 shows: a) a raw input image is colour corrected to give image b). Non-displayable colours are highlighted in purple pseudo colour. Gamut mapping, in step c), brings colours within gamut. Finally, in d), a tone correction step results in the final rendered image.

A display device cannot display all captured image colours; that is, after mapping, some RGBs will fall outside the RGB cube. In FIG. 1b the 'out of gamut' colours are shown in bright purple psuedo-colour. A gamut mapping step, brings the colours back inside the cube as shown in FIG. 1c. The gamut mapping function is a full $\mathbb{R}^3 \to \mathbb{R}^3$ function. Finally, the gamut mapped image is tone mapped to arrive at the final rendered output shown in FIG. 1d. A tone map, or a tone curve, is a simple scalar transfer function, $\mathbb{R} \to \mathbb{R}$, mapping an input brightness to a corresponding output. There might be a single tone curve for each sensor channel or one that operates on all sensor channels simultaneously. Tone curves account for the display nonlinearity, dynamic range compression and some aspects of preference.

Because gamut mapping only nudges the colours (it implements a small change in comparison with colour and tone correction steps), from a modeling perspective the order of gamut mapping and tone correction can be switched (see double arrow in FIG. 1). The input to the pipeline in FIG. 1 is a raw image rgb and the output is a rendered RGB. Throughout this application, rgb denotes raw image values and RGB refers to rendered counterparts. The rendered image is a pleasing reproduction of the captured scene.

Throughout this application, $\underline{\rho}$ denotes a camera raw rgb and $\underline{P}$ its rendered RGB counterpart. Respectively, the 3×3 correction matrix, gamut mapping and tone correction are denoted by the matrix M and the functions $\Gamma(\ )$ and $f(\ )$ The function $f(\ )$ can implement a single or three per-channel tone curves (which, is made clear in the text). See the $3^{rd}$ column of FIG. 1 to link each mathematical function to the example processed image.

When the position of tone mapping and the gamut correction step is reversed—see double arrow in FIG. 1—it can be solved for $f(\ )$ and $\Gamma(\ )$ (although note the best $\Gamma(\ )$ and $f(\ )$ in Eqns. 1a and 1b will be different from one another).

In another embodiment, all three processing steps (correction matrix, gamut mapping and tone correction) may be combined into one and directly solved for a 3D look-up-table that maps raw to rendered counterparts. This look-up-table function is denoted $LUT(\ )$ [22] in Eqn. 1c.

In radiometric calibration, given a set of camera raw and rendered image pairs $(\underline{\rho}_i, \underline{P}_i)$ (i=1, 2, . . . , N) one seeks to solve either for the parameterized pipeline—M, $\Gamma(\ )$ and $f(\ )$—or the 3D function $LUT(\ )$. A disadvantage of the best known performing prior art methods—parameterized or unparameterized—is that a great deal of data is needed to model the processing pipeline. In Eqns. 1 a and 1 b, the gamut mapping step is modelled by 1000s of Radial Basis functions [21, 35, 22] and in Eqn. 1 c, the deployed look-up-table has several thousand control points. To fit a model with a large number of variables, a yet greater number of data-points is needed. A further complication of the LUT method is that the look-up-table has, and has to have for the best performance, a non-linear grid structure [22].

Assuming the gamut mapping step makes small changes to image colours, it has been identified that a rank ordering of the rendered RGBs to be the same as the raw rgbs multiplied by the correction matrix M.

Writing the rank order of two raw red channel measurements post colour correction as $M_1\underline{\rho}_1^a > M_1\underline{\rho}^b$ (where $M_1$ denotes the first row of the colour correction matrix M and $\underline{\rho}^a$ and $\underline{\rho}^b$ are a pair of raw rgbs).

Equally, this rank order implies that $M_1 (\underline{\rho}_1^a - \underline{\rho}_1^b) > 0$. Written in this second way, each ranking made between two pairs of corrected raw measurements mathematically defines is a half-space constraint: exactly one half of all 3-vectors $M_1$ have the property that $M_1 (\underline{\rho}_1^a - \underline{\rho}_1^b) > 0$. Because there are multiple pixels, each pairwise ranking generates a half space constraint and intersecting all these constraints delimits the region in which $M_1$ must lie.

Experiments have demonstrated that a small number of patches suffice to enable estimation of M accurately. Once M is determined, the best rank preserving tone curve(s) $f(\ )$ in a least-squares sense can be determined.

Even without any gamut mapping step, it has been found that the rank preserving M and the least-squares optimal tone curve(s) often suffices to map raw to rendered images (e.g. for the raw+rendered image pairs in [8]). When gamut mapping is needed, a much simpler (parameterized by 200 as oppose to 1000s of variables) correction step is needed if it is needed at all. Reducing the need for gamut mapping is a particular advantage of embodiments of the present invention.

While the colour processing pipeline in FIG. 1 illustrates the process of making a good looking image (for photographic purposes), computer vision researchers are much more interested in the reverse direction. Indeed, there are many computer vision problems where it is essential that the imaging device responds linearly to illumination (double the light=double the recorded image values) including, photometric stereo [27], the calculation of most photometric invariants, e.g. [15], and colour constancy[5]. Embodiments of the present invention can be repurposed to map rendered to raw images with good accuracy.

The rank-based radiometric calibration according to embodiments of the present invention performs well on all datasets tested for both the forward (raw to rendered) and reverse (rendered to raw) directions.

Additionally, the efficacy of embodiments of the present invention according to the perceptual CIE Lab[34] error have been calculated. In experiments, rank-based spectral calibration according to embodiments of the present invention deliver visually almost perfect calibration.

A look-up-table, optimized using lattice regression [14] (which is also used in [22]) can be implemented as a special restrictive case of an radial basis network.

So, Eqns 1a and 1b can be re-written as:

$$\underbrace{f(LUT(M\underline{\rho})) =}_{(6a)} \underbrace{LUT(f(M\underline{\rho})) =}_{(6b)} \underbrace{f(M(LUT(\underline{\rho})))}_{(6c)}$$

Through the generality afforded by a look-up-table a new formulation Eqn. (6c) allows the raw rgbs to be tweaked before the application of M. If the view is taken that the $LUT(\ )$ mops up any remaining error not accounted for by $f(\ )$ and M—solving for $LUT(\ )$ last—then Eqns 6b and 6c are, respectively, formulations for the raw to rendered and rendered to raw calibrations.

Linear raw is important in computer vision for applications from photometric stereo, to photometric invariants to HDR image construction. Ignoring gamut mapping, and assume $f(\ )$ is one to one, the rendered to raw problem has a well defined deterministic inverse.

For either of the general forward rendering models, Eqns. 1a or 1b, different raw rgbs might map to the same rendered RGB (the gamut mapping function makes image rendering many to one). In the method of [21] because we solve directly for $f(\ )$ (from multiple exposures) and M given $f(\ )$ for disaturated pixels, the gamut mapping step in Eqn. 1a can be solved for directly in a least-squares sense:

The most likely rgb can be found together with an estimate of its uncertainty and this uncertainty can be exploited in algorithms that use the estimated raw image [35].

Figure 2:
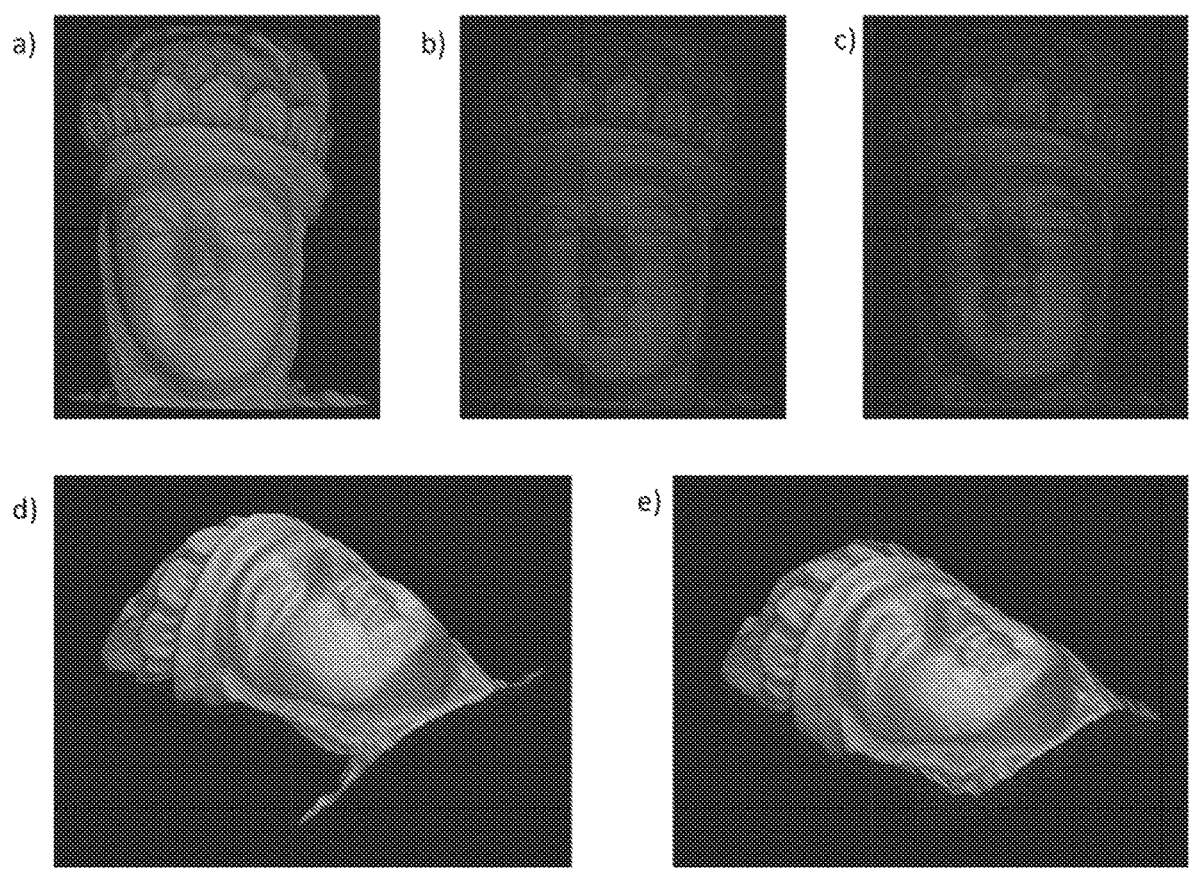
FIGS. 2A through 2E illustrate an example of why it is useful to solve for raw in computer vision, inlcuding correct and incorrect shape recovery.

FIG. 2 illustrates one example of why it is useful to solve for raw in computer vision. FIG. 2a shows a rendered camera image of an object imaged with a multicoloured illumination field. FIGS. 2c and 2d show the correct and gamma only linearisations. FIG. 2d shows the correct shape recovery and 2e the recovery where the image was incorrectly linearized. Both recovered height maps are textured mapped.

Assuming that an image, FIG. 2a, of a single coloured Lambertian object is taken under a complex (multicoloured) illumination field, it is possible to recover the shape of the object from a single colour object [11, 7]. However, like all photometric stereo methods, 'shape from colour' [11] is predicated on the assumption that the captured image is linear. In FIG. 2b correctly linearized images are shown (e.g. linearized using the actual tone map $f(\ )$ and in FIG. 2c, an image is shown linearized by only accounting for the display gamma [3]. Although the raw images look dark (the display gamma is removed) the actual raw is visually different from the 'gamma only' raw. The shape from colour [11] algorithm is then run to recover the object shape. The height maps reconstructed for the correct and gamma-only linearizations are shown in FIGS. 2d and 2e.

Compared to the ground truth—the mask is made on a 3D printer with a known 3D model—the height map of the object is recovered to 96% and 86% accuracy for the correct and gamma-only linearisations. The importance of accurate linearization is established.

The use by [21] of multiple exposures to solve for the tone mapping function is one way that we can decouple the optimization—solve for f( ) independent of M and Γ( )—and in so doing we are able to find calibration deterministically. However, the vast majority of pictures taken nowadays are from mobile phones where multiple exposures are not available. A second problem with mobile devices is that they, almost always, only return the rendered (and not the raw) image to users. This latter problem limits the amount of data that can be used for radiometric calibration. Indeed, if one only has access to the rendered RGBs, the only realistic way to radiometrically calibrate these images is to take a picture of a colour chart—which, best case, will have a couple of hundred of colours, see left most panel of FIG. 5—and then relate these to the image colours measured under standard reference conditions. Finally, the processing applied to any given image may (and should in general [19]) be specific to that image.

Embodiments of the present invention can be used for calibrating in the most general circumstance when the amount of training data is modest and there is only a single calibration image. Assuming that the rank of the rendered RGBs are similar to the corresponding rgbs post-colour correction, embodiments of the present invention enable directly solving for the colour correction matrix M.

In Eqn. 1 b, gamut mapping is applied when, after colour correction, colours are mapped outside the colour cube (not displayable). However, typically, most colours are 'in gamut' and even for those outside the rgb cube they are often just outside. Typically, the distance that a gamut mapping algorithm nudges colours back into the gamut is small. So, if there are changes in ranks these will also be small. Empirically, we have found that rank order is more or less preserved.

To more formally consider rank ordering and the role of gamut mapping, a Taylor expansion is used to model Γ( ) around a point $\underline{a}$ inside the gamut:

$$\Gamma(M\underline{\rho}) \approx \Gamma(\underline{a}) + J(\underline{a})(\underline{\rho}-\underline{a}) \quad (9)$$

where J is the 3×3 Jacobian, or matrix of derivatives, of Γ. Not only does Eqn. 9 teach that, to a first approximation, gamut mapping is an affine transform it is also one of the gamut mapping algorithms proposed in [16]. In particular, [16] solves for the best affine transform that maps image colours inside the cube and which are, simultaneously, close to the non-gamut mapped colours:

$$\min_{T,\,\underline{o}} \sum_i \|TM\underline{\rho}_i + \underline{o} - M\underline{\rho}\|^2 \quad \text{s.t.} \quad \underline{0} \leq TM\underline{\rho}_i + \underline{o} \leq \underline{1} \quad (10)$$

In Eqn. 10, T and $\underline{o}$ are respectively a 3×3 matrix and 3×1 offset vector defining the affine gamut mapping algorithm. The 3-vectors of 0s and 1s are denoted $\underline{0}$ and $\underline{1}$: Equation 10 is solved directly by Quadratic Programming [17]. The gamut mapping shown in FIG. 1c is the result of solving Eqn. 10.

Two important remarks can be made about affine gamut mapping. First, that gamut mapping and colour correction combined can be represented by the single affine transform: 3×3 matrix TM and offset $\underline{o}$. Second, it follows that the rank-based method presented in the next section will actually solve for TM. The offset term is inconsequential to the rank based estimation of colour correction as an offset doesn't change the ranking.

The offset term can be incorporated into the tone mapping function f( ). The following assumes that the T matrix has been incorporated into the colour correction matrix M.

In embodiments of the present invention, ranking provides a powerful tool for directly solving for M in the colour processing pipeline. Denoting the kth row of M as $M_k$, it is assumed that given two colour corrected raw rgbs, $M_k\underline{\rho}^a$ and $M_k\underline{\rho}^b$ the rank order is the same as for the corresponding rendered RGBs:

$$P_k^a > P_k^b \Rightarrow M_k\underline{\rho}^a > M_k\underline{\rho}^b \quad (11)$$

It follows that:

$$M_k(\underline{\rho}_a - \underline{\rho}^b) > 0 \quad (12)$$

Defining the difference vector $\underline{d}^j = \underline{\rho}^a - \underline{\rho}^b$ $$M_k\underline{d}^j > 0 \quad (13)$$

where it is understood that the superscript $^j$ denotes the difference vector from the jth of $$\binom{n}{2}$$

pairs of n image pixel values. Suppose that a vector $M_k$ where Eqn. 13 holds, then the inequality cannot be true for $-M_k$. That is, Eqn. 13 defines a half plane constraint [6]. The vector $\underline{d}^j$ is perpendicular to the half-plane: any $M_k$ less than 90 degrees to $\underline{d}^j$ is a possible solution. Given multiple difference vectors then we have multiple half-plane constraints which taken together delimit a region in 3-space where $M_k$ must lie. Denoting the half-plane as $\mathcal{H}(\underline{d}^j)$, $M_k$ must satisfy:

$$M_k \in \bigcap_j \mathcal{H}(\underline{d}^j) \quad (14)$$

Clearly, if $M_k$ is in the intersection region defined by Eqn. 14 then $\alpha M_k$ (where $\alpha$ is a scalar) is another solution. Using ranking, solving for each rows of M up to an unknown scalar multiplier. The intersection in Eqn. 14 defines an unbounded cone, anchored at the origin, in 3D space. Visualizing the computation of $M_k$ using ranking. Without loss of generality let us assume that $M_{k;3} = 1$. We rewrite (13) as $$M_{k,1}d_1^j + M_{k,2}d_2^j + d_3^j > 0 \quad (15)$$

If [a b c] is a solution to Eqn. 14, then [a/c b/c c/c] Eqn. 15 is also true since $M_{k;1} = a/c$ and $M_{k;2} = b/c$. Solutions for $[M_{k;1}; M_{k;2}]$ lie on one side of the line i.e. the 3-dimensional half-space constraints maps directly to a 2-dimensional half-plane constraint. Or, if the whole set of collations is considered, the cone in 3D, defined by Eqn. 14, maps to a 2D convex region [12]. Denoting half-planes as $\rho(\underline{d}^j)$ we, equivalently, solve for $$[M_{k,1}, M_{k,2}] \in \bigcap_j \rho(\underline{d}^j) \qquad (16)$$

Figure 3:
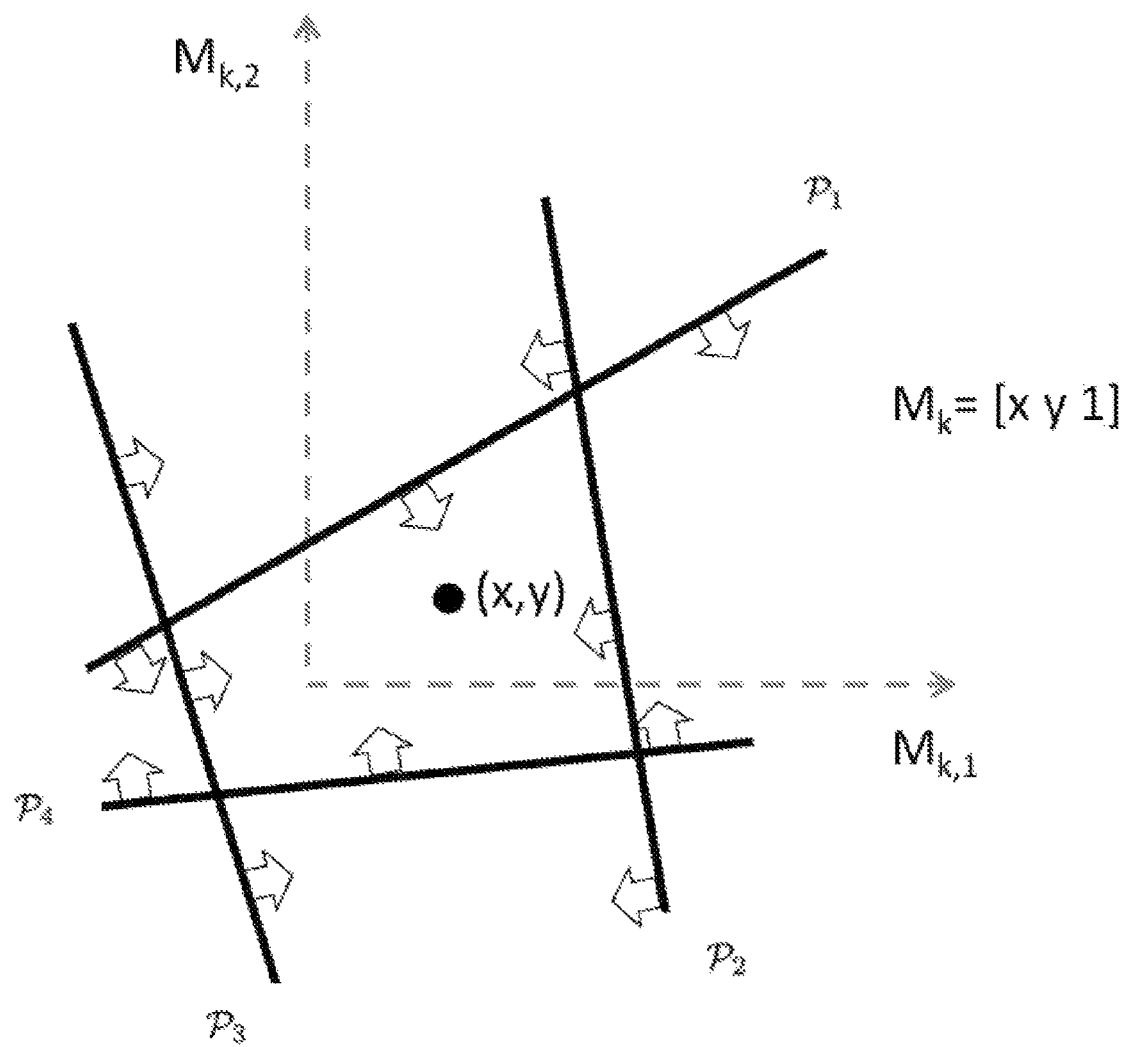
FIG. 3 illustrates the instersection of four half plane constraints, and indicates the solution set where $M_k$ must lie.

The intersection problem of Eqn. 16 is easily visualized. In FIG. 3 the intersection of 4 half plane constraints is shown, indicating the solution set where $M_k$ must lie. FIG. 3 shows the region where 4 half-plane constraints intersect delimit the region where $[M_{1,1}; M_{1,2}]$ must lie. The solution $M_1$ for one point in the intersection region is shown.

Preferred embodiments of the present invention solve for M one sensor channel at a time. Because within a sensor channel each pair of rendered responses has a rank order which, when placed in correspondence with the corresponding raw rgbs, generates a half plane constraint, care is taken not to generate too many half planes.

In selected embodiments, half-planes are generated from all pairs of up to 200 randomly selected unique raw pixels, generating 19900 half-planes. While there exist algorithms for finding the common intersection region using the tools of computational geometry [28], pragmatically, real camera data—due to noise or small deviations from perfect ranking, may generate a set of half-planes with no common intersection.

To solve this non-intersection problem 100,000 unit length vectors are generated that are uniformly distributed on the surface of the unit sphere [29]. With respect to this sampling the furthest distance between any point and its nearest neighbor is less than 1.15 degrees. The orientation of the rows of M are found to this accuracy. For each point on the sphere a possible row of $M_k$, the number of half-space constraint that are satisfied is calculated. The point on the unit sphere that satisfies most half-plane constraints—or the average of multiple points if there is a tie—defines $M_k$. Ranking can only estimate M up to an unknown scaling of its rows. Suppose for a rendered achromatic RGB $\underline{P}^A = [0:5\ 0:5\ 0:5]^t$ the corresponding raw $\underline{\rho}^A = [a\ b\ c]^t$.

$$\text{Then diag}(M\underline{\rho}^A)^{-1}M\underline{\rho}^A = [111]^t \qquad (17)$$

where diag( ) places a vector along the diagonal of a diagonal matrix. After Eqn. 17 has been applied and M maps achromatic colours correctly. Using the constraint to correctly map achromatic colours as a constraint to fix the rows of M.

A simple Matlab implementation finds the best solution for M in just a few seconds.

Rank Based Optimization of Tone Curves

Preferred embodiments of the present invention solve for the optimal tone curve, or tone curves, which map the colour corrected raw rgbs to corresponding rendered RGBs. Where 3 curves are used let $$f([a\ b\ c]^t) = [f_1(a) f_2(a) f_3(a)]^t \qquad (18)$$

where $[a\ b\ c]^t$ denotes some raw rgb post colour correction. Without loss of generality, it is assumed that the raw-rendered pixel pairs $(M_k \underline{\rho}_i, P_{k,i})$ (k indexes sensor channel and i denotes the ith pixel) are sorted in ascending order for the corrected raw pixel values (according to the key $M_k \underline{\rho}_i$).

Then, the kth rank-based tone curve optimization is written as:

$$\min_{f_k(\ )} \sum_i \|\alpha_i M_k \underline{\rho}_i - P_{i,k}\|^2 \text{ where } \alpha_i \geq \alpha_{i-1}(i > 1) \qquad (19)$$

To find a single tone curve (for all 3 sensor channels) ($q_i$; $P_i$) ($q_i$ is the ith colour corrected pixel value (corresponding to an r, g or b) in rank order and $P_j$ is the corresponding rendered value). Minimizing $$\min_{f(\ )} \sum_j \|\alpha_i q_i - P_i\|^2 \text{ where } \alpha_i \geq \alpha_i(i > 1) \qquad (20)$$

Given the formulation in Eqns. 19 or 20, solving for the terms _i using the Pooled Adjacency Violators (PAVA) algorithm [4] is possible. The functions f( ) and $f_k$( ) can be represented as continuous functions by adopting a suitable interpolation scheme. Also, because the functions found in Eqns. 19 and 20 may have sharp transitions a final smoothing step is applied [26]. The rank-based method work works well when a direct or a smoothed PAVA regression is used. Smoothed PAVA regression curves are typically well modelled by parametric fits—e.g. by polynomials—with few—7 to 10—numbers of coefficients.

Gamut Correction

To reduce any remaining error, embodiments may optionally find a 6×6×6 look-up-table—implementing gamut mapping—using lattice regression [14] that minimizes:

$$\min_{LUT(\ )} \sum_i \|LUT(f(M\underline{\rho})) - P_j\|^2 \qquad (21)$$

Note, the lattice regression here has few parameters because it is preferably aimed to solve for the rank-based radiometric calibration with 200 or fewer colours (i.e. with a colour chart). A LUT with fewer parameters (e.g. 4×4×4) can be used.

Rank-Based Recovery of Rendered

According to our method a raw image is mapped to a rendered counterpart in three steps. We solve for the colour correction Matrix M using the ranking method. Then using 1 or 3 tone curves we solve for the optimal rank preserving tone curves in (19) or (20) and apply the gamut correction step in (21).

Once the processing pipeline is uncovered we might usefully apply this knowledge. First, we might derive the pipeline for a given training image pair (raw and rendered) and apply it to an unseen raw. This for example, would allow us to apply the camera processing for a camera model X to a camera model Y. Our method allows us to implement multiple pipelines even though only one is provided by the manufacturer. Second, the discovered processing pipeline could be given to the user. This processing would be a good starting point for the user to further adjust the image. Third, the individual pipeline steps might be modified (e.g. by providing an improved gamut mapping step). That is our method provides a platform for the further development of camera pipelines.

Rank-Based Recovery of Raw

Suppose it is desired to map rendered RGBs to raw. Using the method presented above, as for the forward direction, solve for M. Now, in a least-squares optimal way, we use the PAVA [4] method to find $$\min_{f^{-1}()} \sum_i \|f^{-1}(P_i) - M\rho_i\| \quad (22)$$

Then we solve for $$\min_{LUT()} \sum_i \|LUT(M^{-1}f^{-1}(P_i)) - \rho_i\| \quad (23)$$

Again the LUT( ) in Eqn. 23 can be found using a 6×6×6 lattice regression [14]. It could be the case that the user can obtain a rendered image but has no access to raw. In this case a reference colour chart—whose raw values are known for a reference camera (or for a reference colour space)—can be placed in the scene. Then the rendered to raw pipeline is recovered for the colour chart (the colour chart image is mapped to the standard raw). Then the uncovered pipeline is used to process the rest of the image (the image excluding the colour chart). Another way reference information might be found is by identifying content in images of known colour e.g. finding faces, sky, grass etc and then calibrating against the standard colours of this content.

There are several applications that follow from the rendered to raw method. First, we map non-linear rendered images to raw counterparts and in so doing support computer vision tasks which require linear images. Second, we can tag a rendered image with the individual processing steps required to map it to raw. The compressed jpeg and he processing steps are coded in much less memory than the original raw. Our method allows the user to have the advantages of raw but with much reduced memory requirements. Finally, one shot calibration—uncovering the pipeline by relating the image of a colour chart to a standard reference image and then applying the pipeline to the rest of the image—becomes possible. The method allows a mobile phone—where raw is almost never provided—to produce raw and in so doing to be used as a measurement device.

Experiments

It is important to understand the provenance of the raw image shown in FIG. 1. To generate the raw image (1a) we took one of the hyper spectral images measured in [13] and make the corresponding camera image by numerical integration [32] where the measured sensitivities of a Nikon DSLR camera [9] are used. The affine gamut mapping algorithm of [16] is implemented to deal with out of gamut colours. So, the whole pipeline can be described by a linear transform M and 3 tone curves. Reassuringly, rank-based estimation of M and f( ) alone suffices to model the reproduction pipeline: the output of rank-based radiometric calibration (it recovers the same image as shown in FIG. 1d). Further, the rank-based method recovers the actual correct M.

The method of Chakrabati et al [35] works equally well in solving for a pipeline that maps FIG. 1a to 1d. However, below we include the colour correction matrices derived by rank-based radiometric method and which was found using Chakrabarti et als method [35]. For comparison we scale each row to have a maximum of 1. Clearly, the matrices while broadly similar are quite different $$\begin{bmatrix} 1.00 & -0.20 & 0.07 \\ -0.10 & 1.00 & -0.37 \\ -0.17 & 0.89 & 1.00 \end{bmatrix} \begin{pmatrix} \text{Rank-based} \\ \text{Minimization} \end{pmatrix}$$

$$\begin{bmatrix} 1.00 & -.08 & -0.14 \\ -0.11 & 1.00 & -0.34 \\ -0.26 & 1.00 & 1.00 \end{bmatrix} \begin{pmatrix} \text{Iterative} \\ \text{Minimization} \end{pmatrix}$$

That two colour correction matrices with suitably chosen tone correction steps and gamut mapping can deliver the same result indicates that there are degrees of freedom in how we might solve the radiometric calibration problem. As a design aim of our rank-based method we seek to solve for as simple a pipeline as possible.

Raw to Rendered

In [8] 85 raw images are mapped to rendered with good accuracy using (3a) and (3b) in iteration. This data set contains a small number of fairly representative scenes taken with a range of different colour cameras. To evaluate how well rendered images are predicted, a perceptual error measure is appropriate. As the aim of photographic pipelines is for ourselves to look at pictures, one pipeline is judged better than another in terms of how the images look. Assuming that images are coded according to the sRGB standard [3] and making modest assumptions about the viewing conditions (e.g. [2] it is straightforward to transfer the pixels in a rendered image to corresponding CIE Lab triples [34]: (r, g, b)→(L, a, b). In 'CIE Lab space' the Euclidean distance, or 'Delta E' between Lab vectors are more proportional to our perception of how similar or different images are. The units of the CIE Lab transform are chosen so that a Euclidean distance of 1, and communicated as 1 "Delta E", corresponds to a just noticeable colour difference to a human observer. In images a mean Delta E of 3[33] or 5 [24] Meyer is visually not noticeable.

Figure 4:
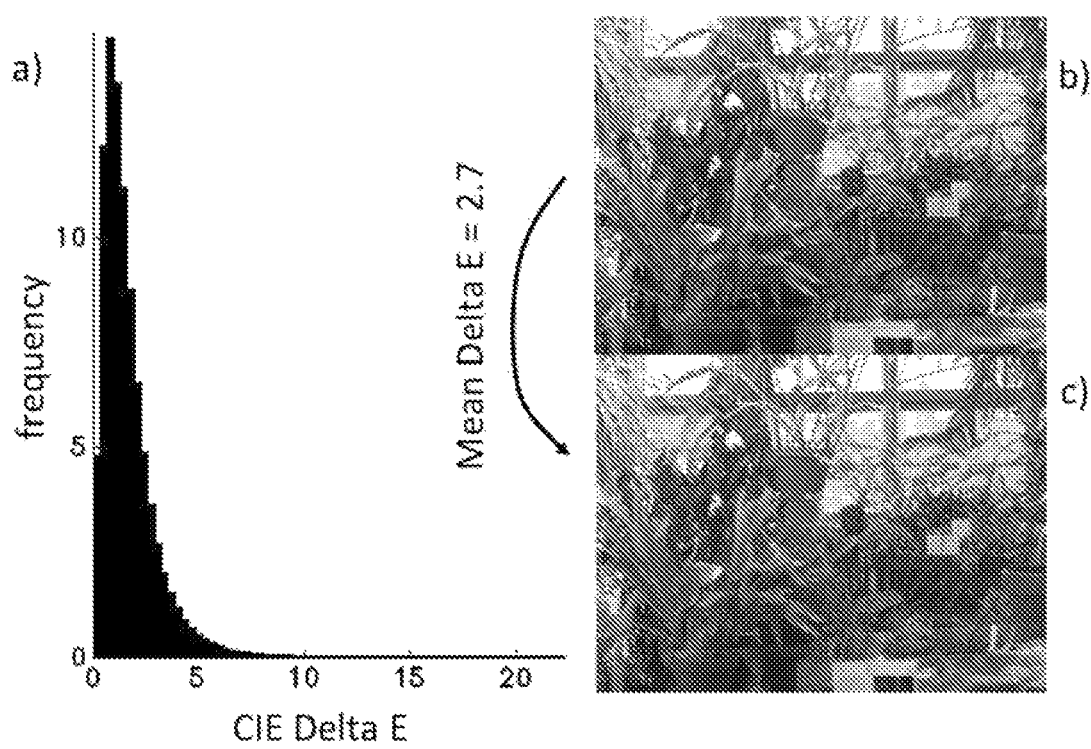
FIGS. 4A through 4C show results provided in accordance with the present disclosure.

Results are shown in FIG. 4. In FIG. 4a there is shown a histogram of Delta E errors for the raw to rendered prediction for the rank-based method for the 85 images in [8]. In 4b there is shown the true rendered RGB image and in 4c the rank-based prediction. Over all the 85 images, the histogram of Delta E's is accumulated and is shown in FIG. 4a. The average Delta E for all images is 1.5 and the worst case (the average over the most challenging of the 85 test images) is 2.7. In FIGS. 4b and 4c we show the actual rendered rgb image and the conversion to raw using the rank-based method for the image that has the highest average Delta E. Visually, the pictures look the same. Even when successively flipping between the images one on top each other it is hard to notice any change. Like [35] we found colour correction and tone mapping alone provided good results for this data set with an average Delta E of 2.7 (again according to the experiments of [33] or 5 [24] the predicted rendered images look the same as the ground truth).

One Shot Calibration

Figures 5, 6:
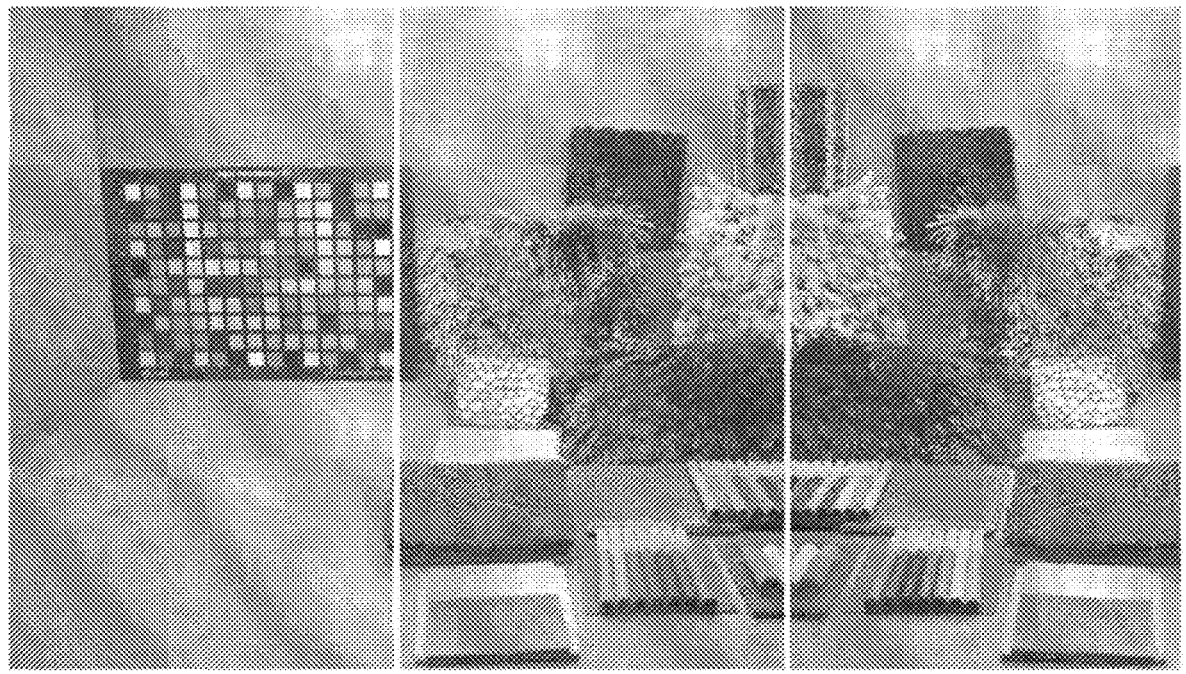
FIG. 5 illustrates an example of an image used for rank-based radiometric callibration in accordance with the present disclosure, including a source image (Left), a true rendered image (Middle), and a prediction from raw (Right).
FIG. 6 shows a table (Table 1) that provides RMSE for mappying rendered to raw.

Embodiments of the present invention seek to provide a method that can be trained on a small number of patches. In FIG. 5, a simple colour scene is shown where there is a picture of a colour chart on the left. The patches from this image are used to estimate a rank-based radiometric calibration. In FIG. 5, Left panel there is shown an image used for rank-based radiometric calibration. The middle panel shows true rendered image. The right panel (note flipped horizontally) shows prediction from raw.

There are occasions where there is no access to raw but would it is desirable to map the rendered image to a standard raw. Further, in line with the experiments reported above, it is desirable to evaluate the calibration using a Delta E metric. For our raw image we use the XYZ tristimuli [34] that we measured for the colour target using a spectraradiometer. XYZ coordinates can be related to the responses of the human eye and can be mapped to CIE Lab values. The parameters M and f( ) are found using ranking as described above and the LUT( ) also described above is used to map image rendered rgbs to corresponding XYZs and then transform these to Lab values. For the colour chart itself the rank-based method according to embodiments of the present invention predicts the XYZs with an error of just 1.6 on average (visually not noticeable).

A more interesting question is what is the error for the right hand side of the picture i.e. how well does calibration work for test data that is independent of the training set? As the raw camera values are obtained and it is assumed the spectral calibration described in [18] (one of the cameras calibrated in that paper was used), it is possible to map image raw to estimates of the XYZs. These estimates are used as ground truth. The Lab image for the estimate XYZs can then be calculated.

Taking a rank-based calibration discovered for the colour chart in the image and using it to map the rest of the image to XYZs and then to CIE Lab values, the estimated Lab values are compared to the ground truth. The mean Delta E for the scene is 4.1. While this is slightly higher than discussed above, a number of assumptions are made in order to calculate it. For example, the responses of the camera cannot be exactly mapped to XYZs and this fact alone probably impacts negatively on the average Delta E error. Still, it is very low and indicative of visually non-noticeable difference [24].

The checker can also be used to radiometrically calibrate in the forward direction, from raw to rendered. The checker is shown in the left of FIG. 5. In the middle panel is the actual right hand side of the image. The rank-based raw to rendered calibration this results in the left panel (the order of the pixels is flipped in the x-direction to allow easier comparison). For raw to rendered, rank-based calibration provides visually near perfect results.

Unlike much of prior methods and systems, calibration to raw can be performed with a simple colour chart.

Rendered to Raw

In [35] a probabilistic framework for mapping rendered rgb to raw was presented. In their method they solve for M, f and Γ (implemented as a radial basis function network) that, given a rendered RGB input returns a mean estimate for the raw rgb together with the uncertainty of the estimate. Their most likely answer is taken as the endpoint in their radiometric (rendered to raw) calibration. For comparison, the rank based rendered to raw calibration set forth above is applied. The performance of [35] is shown in the 2nd column of Table 1 (see FIG. 6) and the rank-based calibration results are shown in column 3. In the last column there is shown the RMSE arrived at using a 3-fold cross validation for rank-based radiometric calibration. The raw image data is in the interval [0,1] so an RMSE err of 0.01 is 1% of the interval.

Rank-based radiometric calibration delivers the same performance as the much more complicated method [35]. It does so needing much less training data and a non-iterative training regime.

It will be appreciated that the various features described above are complimentary and may be selectively combined as desired. It will also be appreciated that features described in the context of the system may be applied to the method and vice-versa. It is also to be appreciated that certain embodiments of the invention as discussed below may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

This application claims priority from GB1420876.3, the content of which and the content of the accompanying abstract are herein incorporated by reference.

REFERENCES

[1] Linear demosaicing inspired by the human visual system. IEEE Transactions on Image Processing, 14(4):439-449, 2005. 3

[2] Iso 3664:2009. graphic technology and photography viewing conditions, 2009. 7

[3] M. Anderson, R. Motta, S. Chandrasekar, and M. Stokes. Proposal for a standard default color space for the internet: srgb. In IS&T and SID's 4th Color Imaging Conference, pages 238-245. 1995. 1, 4, 7

[4] R. Barlow and H. Bunk. The isotonic regression problem and its dual. Journal of the American Statistical Association, pages 140-147, 1972. 6

[5] K. Barnard, L. Martin, A. Coath, and B. V. Funt. A comparison of computational color constancy algorithms. ii. experiments with image data. IEEE Transactions on Image Processing, 11(9):985-996, 2002. 2

[6] M. d. Berg, O. Cheong, M. v. Kreveld, and M. Overmars. Computational Geometry: Algorithms and Applications. Springer-Verlag TELOS, 3rd ed. edition, 2008. 5

[7] G. J. Brostow, C. Hern'andez, G. Vogiatzis, B. Stenger, and R. Cipolla. Video normals from colored lights. IEEE Trans. Pattern Anal. Mach. Intell., 33(10):2104-2114, 2011. 4

[8] A. Chakrabarti, D. Scharstein, and T. Zickler. An empirical camera model for internet color vision. In British machine Vision Conference, 2009. 1, 2, 3, 7

[9] M. Darrodi, G. Finlayson, T. Goodman, and M. Mackiewicz. A ground truth data set for a nikon camera's spectral sensitivity estimation. 2014. 7

[10] P. Debevec and J. Malik. Recovering high dynamic range radiance maps from photographs. In SIGGRAPH, pages 369-378, 1997. 3

[11] M. S. Drew and M. H. Brill. Color from shape from color: a simple formalism with known light sources. J. Opt. Soc. Am. A, 17(8):1371-1381, August 2000. 4

[12] G. Finlayson. Color in perspective. IEEE transactions on Pattern analysis and Machine Intelligence, pages 1034-1038, October 1996. 5

[13] D. H. Foster, K. Amano, S. M. C. Nascimento, and M. J. Foster. Frequency of metamerism in natural scenes. J. Opt. Soc. Am. A, 23(10):2359-2372, October 2006. 7

[14] E. K. Garcia, R. Arora, and M. R. Gupta. Optimized regression for efficient function evaluation. IEEE Transactions on Image Processing, 21(9):4128-4140, 2012. 3, 6

[15] T. Gevers, G. D. Finlayson, and R. Schettini. Color for image indexing and retrieval. pages 1-2, 2004. 2

[16] J. Giesen, E. Schuberth, K. Simon, P. Zolliker, and O. Zweifel. Image-dependent gamut mapping as optimization problem. Image Processing, IEEE Transactions on, 16(10):2401-2410, October 2007. 1, 5, 7

[17] P. E. Gill, W. Murray, and M. H. Wright. Practical optimization. Academic Press Inc. [Harcourt Brace Jovanovich Publishers], 1981. 5

[18] J. Gu, J. Jiang, S. Susstrunk, and D. Liu. What is the space of spectral sensitivity functions for digital color cameras? In Proceedings of the 2013 IEEE Workshop on Applications of Computer Vision (WACV), WACV '13, pages 168-179, 2013. 8

[19] J. Holm. Photometric tone and colour reproduction goals. In Proceedings of CIE Export Symposium on Colour Standards for Image Technology, pages 51-56. 1996.

[20] J. Holm. Issues relating to the transformation of sensor data into standard color space. In IS&T and SID's 5th Color Imaging Conference, pages 290-295. 1997. 3

[21] S. J. Kim, H. T. Lin, Z. Lu, S. Susstrunk, S. Lin, and M. S. Brown. A new in-camera imaging model for color computer vision and its application. IEEE Transactions on Pattern Analysis and Machine Intelligence, 34(12):2289-2302, 2012. 1, 2, 3, 4

[22] H. T. Lin, Z. Lu, S. J. Kim, and M. S. Brown. Nonuniform lattice regression for modeling the camera imaging pipeline. In European Conference on Computer Vision, volume 7572 of Lecture Notes in Computer Science, pages 556-568. Springer, 2012. 2, 3

[23] S. Lin, J. Gu, S. Yamazaki, and H.-Y. Shum. Radiometric calibration from a single image. In Computer Vision and Pattern Recognition, 2004. CVPR 2004. Proceedings of the 2004 IEEE Computer Society Conference on, volume 2, pages II-938-II-945 Vol. 2, June 2004.

[24] G. W. Meyer, H. E. Rushmeier, M. F. Cohen, D. P. Greenberg, and K. E. Torrance. An experimental evaluation of computer graphics imagery. ACM Transactions on Graphics, 5:30-50, 1986. 7, 8

[25] T. Mitsunaga and S. Nayar. Radiometric Self Calibration. In IEEE Conference on Computer Vision and Pattern Recognition (CVPR), volume 1, pages 374-380, June 1999. 2

[26] S. U. D. of Statistics. Project ORION., J. Friedman, and R. Tibshirani. The Monotone Smoothing of Scatterplots. 1983. 6

[27] A. Petrov. On obtaining shape from color shading. COLOR research and application, 18(4):236-240, 1993. 2

[28] F. P. Preparata and M. I. Shamos. Computational Geometry: An Introduction. Springer-Verlag New York, Inc., New York, N.Y., USA, 1985. 5

[29] E. Rakhmanov, E. Saff, and Y. Zhou. Minimal discrete energy on a sphere. Mathematical Research letters, pages 647-662, 1994. 5

[30] R. Ramanath, W. Snyder, Y. Yoo, and M. Drew. Color image processing pipeline. Signal Processing Magazine, IEEE, 22(1):34-43, 2005. 1, 3

[31] E. Reinhard, M. Stark, P. Shirley, and J. Ferwerda. Photographic tone reproduction for digital images. ACM Trans. Graph., 21(3):267-276, July 2002. 1

[32] B. Smith, C. Spiekermann, and R. Sember. Numerical methods for colorimetric calculations: Sampling density requirements. COLOR research and application, 17(6):394-401, 1992. 7

[33] M. Stokes, M. Fairchild, and R. Berns. Precision requirements for digital color reproduction. ACM Transactions on Graphics, 11(4):406-422, October 1992. 7

[34] G. Wyszecki and W. Stiles. Color Science: Concepts and Methods, Quantitative Data and Formulas. Wiley, New York, 2nd edition, 1982. 2, 7

[35] Y. Xiong, D. Scharstein, A. Chakrabarti, T. Darrell, B. Sun, K. Saenko, and T. Zickler. Modeling radiometric uncertainty for vision with tone-mapped color images. IEEE Transactions on Pattern Analysis and Machine Intelligence, 99(PrePrints):1, 2014. 1, 2, 3, 4, 7, 8

The invention claimed is:

1. A method for determining parameters of an image processing pipeline of a digital camera, the image processing pipeline transforming captured image data on a scene into rendered image data, the method comprising:
   obtaining rendered image data produced by the image processing pipeline of the camera from the captured image data on the scene;
   determining at least a subset of the captured image data on the scene;
   obtaining a ranking order for pixels of the rendered image data;
   determining a set of constraints from the captured image data and the ranked rendered image data, each constraint of the set being determined in dependence on selected pair combinations of pixel values when taken in said ranking order of the rendered image data and corresponding pair combinations of the captured image data; and,
   determining parameters of the image processing pipeline that satisfy the sets of constraints.

2. The method as claimed in claim 1, wherein the subset of the captured image data on the scene is obtained as RAW image data from the digital camera.

3. The method as claimed in claim 1, wherein the scene includes a reference target, the method further comprising storing image data on the reference target, the step of determining the set of constraints including using the stored image data in place of captured image data on the scene.

4. The method as claimed in claim 1, wherein the scene includes a reference target and wherein reference content of known colour in the scene is inferred and used as the reference target, and wherein the reference content includes at least one of faces, sky, grass and branded objects including food packaging.

5. The method as claimed in claim 1, further comprising performing the steps of obtaining a ranking and determining a set of constraints for a colour channel of the rendered image data and captured image data.

6. The method as claimed in claim 5, further comprising performing the steps of obtaining a ranking and determining a set of constraints for each colour channel, wherein the parameters include a correction matrix.

7. The method as claimed in claim 5, wherein each per channel constraint comprises a half plane constraint, the step of determining parameters comprises determining an intersection region bounded by the half plane constraints and determining one row of a correction matrix within the intersection region.

8. The method as claimed in claim 7, further comprising finding a best intersection of the half plane constraints, wherein the best intersection is a vector, chosen from a discrete sample set, which satisfies a maximum number of half plane constraints.

9. The method as claimed in claim 1, further comprising deriving the parameters for the image processing pipeline for a given training image pair, the training image pair including raw image data and rendered image data.

10. The method as claimed in claim 9, further comprising applying the parameters to an unseen raw image wherein the unseen raw image comprises a raw image from another camera.

11. The method as claimed in claim 1, further comprising receiving one or more modifications to the parameters and/or the image processing pipeline via a user interface.

12. The method as claimed in claim 1, further comprising:
placing a reference colour chart in the scene whose, raw values are known for a reference camera or for a reference colour space;
recovering a rendered to raw image processing pipeline for the reference colour chart in the scene by mapping a colour chart image to the known raw values; and,
using the recovered image processing pipeline to process an image and generate a modified image.

13. The method as claimed in claim 12, wherein the recovered image processing pipeline is used to process the captured scene excluding the colour chart.

14. The method as claimed in claim 1, further comprising mapping a non-linear rendered image to a raw counterpart of the non-linear rendered image.

15. The method as claimed in claim 1, further comprising tagging, a rendered image with processing steps required to map the rendered image to a raw image.

16. A system for determining parameters of an image processing pipeline of a digital camera, the image processing pipeline transforming captured image data on a scene into rendered image data, the system comprising:
an input arranged to receive rendered image data produced the image processing pipeline of the camera from the captured image data on the scene;
a processor configured to execute computer program code for executing an image processing module, including:
computer program code configured to determine at least a subset of the captured image data on the scene;
computer program code configured to obtain a ranking order for pixels of the rendered image data;
computer program code configured to determine a set of constraints from the captured image data and the ranked rendered image data, each constraint of the set being determined in dependence on selected pair combinations of pixel values when taken in said ranking order of the rendered image data and corresponding pair combinations of the captured image data; and,
computer program code configured to determine parameters of the image processing pipeline that satisfy the sets of constraints.

17. The system as claimed in claim 16, wherein the image processing pipeline is a colour processing pipeline, the parameters being determined in a forward direction, mapping a captured image to a rendered image.

18. The system as claimed in claim 16, wherein the image processing pipeline is a colour processing pipeline, the parameters being determined in a reverse direction, mapping a rendered image to a captured image.

19. The system as claimed in claim 16, further comprising a camera input, wherein the subset of the captured image data on the scene is obtained as RAW image data from the digital camera via the camera input.

20. The system as claimed in claim 16, further comprising a reference target in the scene, the system being arranged to store image data on the reference target, the computer program code to determine the constraints being configured to use the stored image data in place of captured image data on the scene.

* * * * *